United States Patent
Epstein et al.

(10) Patent No.: US 7,133,534 B2
(45) Date of Patent: Nov. 7, 2006

(54) COPY PROTECTION VIA REDUNDANT WATERMARK ENCODING

(75) Inventors: Michael A. Epstein, Spring Valley, NY (US); Robert M. McDermott, Montross, VA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 628 days.

(21) Appl. No.: 10/233,454

(22) Filed: Sep. 3, 2002

(65) Prior Publication Data

US 2004/0042635 A1  Mar. 4, 2004

(51) Int. Cl.
*G06K 9/00* (2006.01)
(52) U.S. Cl. .................................................. 382/100
(58) Field of Classification Search ............... None
See application file for complete search history.

(56) References Cited

U.S. PATENT DOCUMENTS

| | | | | |
|---|---|---|---|---|
| 6,064,764 | A * | 5/2000 | Bhaskaran et al. | 382/183 |
| 6,192,139 | B1 | 2/2001 | Tao | 382/100 |
| 6,208,735 | B1 | 3/2001 | Cox et al. | |
| 6,246,775 | B1 | 6/2001 | Nakamura et al. | |
| 6,252,972 | B1 | 6/2001 | Linnarts | |
| 6,278,792 | B1 * | 8/2001 | Cox et al. | 382/100 |
| 6,396,937 | B1 * | 5/2002 | Chen et al. | 382/100 |
| 6,697,306 | B1 * | 2/2004 | Sako | 369/47.12 |
| 6,744,906 | B1 * | 6/2004 | Rhoads et al. | 382/100 |
| 6,820,125 | B1 * | 11/2004 | Dias et al. | 709/229 |
| 2002/0053026 | A1 * | 5/2002 | Hashimoto | 713/176 |
| 2002/0095577 | A1 * | 7/2002 | Nakamura et al. | 713/176 |
| 2002/0122564 | A1 * | 9/2002 | Rhoads et al. | 382/100 |
| 2002/0149976 | A1 * | 10/2002 | Sako | 365/200 |
| 2003/0025423 | A1 * | 2/2003 | Miller et al. | 312/100 |
| 2003/0056104 | A1 * | 3/2003 | Carr et al. | 713/176 |
| 2003/0070075 | A1 * | 4/2003 | Deguillaume et al. | 713/176 |
| 2003/0128860 | A1 * | 7/2003 | Braudaway et al. | 382/100 |
| 2003/0223099 | A1 * | 12/2003 | Fan et al. | 358/537 |
| 2005/0254684 | A1 * | 11/2005 | Rhoads | 382/100 |

FOREIGN PATENT DOCUMENTS

| | | |
|---|---|---|
| EP | 0984616 A2 | 3/2000 |
| JP | 2003022389 * | 1/2003 |
| WO | WO0173997 | 10/2001 |

* cited by examiner

*Primary Examiner*—Samir Ahmed
*Assistant Examiner*—Oneal R Mistry
(74) *Attorney, Agent, or Firm*—Larry Liberchuk

(57) ABSTRACT

A watermark is encoded redundantly so as to provide effective copy protection. To assure a reliable detection of the watermark in the presence of a potentially faulty watermark detection process, some or all of the watermark is redundantly encoded. The number of redundant encodings of the watermark is selected so that upon modification of the watermarked material, sufficient redundancy exists so that the material can be identified as watermarked material, and the number of detected copies of the watermark is used to detect the modification. Statistical processes are employed to determine the presence or absence of the watermarks in the presence of a potentially faulty watermark detection process. Different criteria may be applied to the watermark detection process for the verification of the watermarked portions, based on the desired degree of confidence for determining whether the appropriate watermark is present or absent, and the desired degree of confidence for determining whether a modification has occurred.

14 Claims, 2 Drawing Sheets

COPY PROTECTION VIA REDUNDANT WATERMARK ENCODING

BACKGROUND OF THE INVENTION

1. Field of the Invention

This invention relates to the field of data protection, and in particular to protecting data from illicit copying from a remote source.

2. Description of Related Art

The protection of data is becoming an increasingly important area of security. In many situations, the authority to copy or otherwise process information is verified by evaluating the encoding of copy-protected material for particular characteristics. For example, on copy-protected material may contain watermarks or other encodings that identify the material as being copy-protected, and also contains other encodings that identify whether this particular copy of the material is an authorized copy, and whether it can be copied again. For example, an authorized copy of content material may contain a robust watermark and a fragile watermark. The robust watermark is intended to be irremovable from the encoding of the content material. Attempting to remove the watermark causes damage to the content material. The fragile watermark is intended to be damaged when the content material is illicitly copied. For example, common fragile watermarks are damaged if the content material is compressed or otherwise altered. In this manner, content material that is compressed in order to be efficiently communicated via the Internet will be received with a robust watermark and a damaged fragile watermark. A content-processing device that is configured to enforce copy protection rights in this example will be configured to detect the presence of a robust watermark, and prevent the processing of the content material containing this robust watermark unless an appropriate fragile watermark is also present. The assumption being that compressed content represents an unauthorized transfer of copyrighted material.

The design of a watermarking encoding process and corresponding watermark detection involves a tradeoff among conflicting requirements. An ideal watermark should be undetectable during a conventional rendering of the content material, yet easily detectable by the watermark detector. As the watermark's detectability by the watermark detector increases, so too does its detectability during a conventional rendering; similarly, as the watermark's undetectability during a convention rendering decreases, so too does its undetectability by the watermark detector. Conventional watermarking processes are biased to assure that the watermarking process does not affect the quality of the rendering of the content material, often at the cost of reduced detectability by a watermark detector. That is, the likelihood of a watermark detector producing an erroneous decoding of a watermark, or failing to detect the watermark, is not insubstantial.

In the aforementioned use of both a robust watermark and a fragile watermark, each watermarking process must be designed within these conflicting tradeoff requirements, and each watermarking process must be configured to have a different susceptibility to damage. The robust watermark must be substantially undetectable by the conventional rendering process, yet also be robust enough to be recognizable after the watermarked material has been compressed and reformulated into a decompressed form. The fragile watermark must also be substantially undetectable by the conventional rendering process, yet also fragile enough so that a reformulation of the material causes damage to the fragile watermark. Additionally, each of the watermark processes must be configured so that they do not interfere with each other.

BRIEF SUMMARY OF THE INVENTION

It is an object of this invention to provide a robust and reliable copy protection scheme that accommodates a detection of a modification to the watermarked material, but does not require the use of multiple watermarking processes. It is a further object of this invention to provide a copy protection scheme that is fault tolerant.

These objects and others are achieved by the use of a watermark that has multiple degrees of redundancy. To assure a reliable detection of the watermark in the presence of a potentially faulty watermark detection process, some or all of the watermark is redundantly encoded. Whenever the watermarked material is modified, the quality of the watermark decreases, and the likelihood of each redundant copy of the watermark being detected by a watermark detector decreases. The number of redundant encodings of the watermark is selected so that upon modification of the watermarked material, sufficient redundancy exists so that the material can be identified as watermarked material, and the number of detected or undetected copies of the watermark is used to detect the modification. Statistical processes are employed to determine the presence or absence of the watermarks in the presence of a potentially faulty watermark detection process. Different criteria may be applied to the watermark detection process for the verification of the watermarked portions, based on the desired degree of confidence for determining whether the appropriate watermark is present or absent, and the desired degree of confidence for determining whether a modification has occurred.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
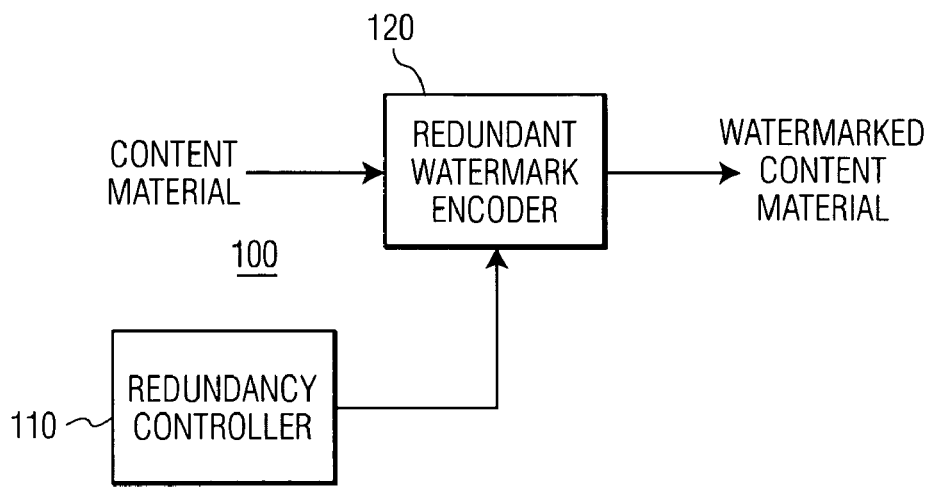
FIG. 1 illustrates an example block diagram of a watermark encoding system in accordance with this invention.

U.S. Pat. No. 6,252,972 "METHOD AND ARRANGEMENT FOR DETECTING A WATERMARK USING STATISTICAL CHARACTERISTICS OF THE INFORMATION SIGNAL IN WHICH THE WATERMARK IS EMBEDDED", issued Jun. 26, 2001 to Johan P. M. G. Linnartz, and incorporated by reference herein, teaches an encoding process wherein a particular binary pattern of +1 and −1 is added to each element of the content material. At the detector, the same binary pattern is applied to the received input signal to determine whether a sufficient correlation exists to decide that the received input contains this pattern. U.S. Pat. No. 6,208,735 "SECURE SPREAD SPECTRUM WATERMARKING FOR MULTIMEDIA DATA", issued Mar. 27, 2001 to Ingemar J. Cox et al, and incorporated by reference herein teaches a watermarking technique wherein a spread spectrum encoding of the watermark is applied to the content material, wherein the spread spectrum information is particularly targeted to the significant frequency components of the content material.

Because common watermark detection processes are not 100% reliable, a fault in the detection process may be interpreted by a security process as an erroneous watermark, and the rendering of the content material may be inappropriately terminated. That is, the content material may be authorized for rendering, and contain a proper watermark, but the fault in the detection process may indicate an improper watermark, or no watermark.

In accordance with this invention, the watermark is redundantly encoded such that the amount of redundancy determines the likelihood of the watermark being detected, assuming a potentially faulty watermarking detection process, and such that the number of proper detections of the watermark determines whether the material has been modified. In each of the above referenced encoding techniques, for example, the same pattern of +1 and −1 additions, or the same spread spectrum encoding is repeatedly applied to the content material.

During the detection process, the redundantly watermarked content material is scanned until a corresponding +1/−1 pattern, or a corresponding spread spectrum encoding is detected. Assuming that the watermark detection process is potentially faulty, the number of times that the same pattern is encoded will determine the likelihood of the watermark being detected. If, for example, the watermark is only singly encoded, the likelihood of the watermark being detected will be (1−p), where p is the inherent probability of the watermark detector not properly detecting the watermark. If the watermark is encoded twice, the likelihood of detection is $(1-p^2)$; if the watermark is encoded three times, the likelihood of detection is $(1-p^3)$; etc.

If the watermarked content material is altered, the quality of the watermark decreases, and the inherent probability of the watermark detector not properly detecting the watermark, using conventional watermark encoding and decoding techniques, increases. Defining this new inherent probability as q, the likelihood of a watermark detector not properly detecting a redundantly encoded watermark is expressed as $(1-q^n)$, where n is the number of encodings of the same watermark.

In accordance with this invention, the parameter n is selected to provide a very high likelihood of detection, regardless of whether the material is altered. In accordance with a second aspect of this invention, the detection process includes a statistical procedure that further provides a control over the likelihood of detecting altered watermarked content material, based on the probabilities of detection p and q, for unaltered and altered content material, respectively, discussed further below.

FIG. 1 illustrates an example block diagram of a watermark encoding system 100 in accordance with this invention. The encoding system 100 includes a redundancy controller 110 that controls a redundant watermark encoder 120. As noted above, any of a variety of watermark encoding techniques may be included in the watermark encoder 120, provided that the technique allows for a repetition of the watermark within the same content material. In accordance with this invention, the redundancy controller 110 controls the redundant watermark encoder 120 such that the likelihood of detecting at least one copy of the watermark is high, even if the content material is altered. Additionally, the redundancy controller 110 controls the redundant watermark encoder 120 such that the number of properly detected watermarks can be used to distinguish between altered and unaltered content material.

Figure 2:
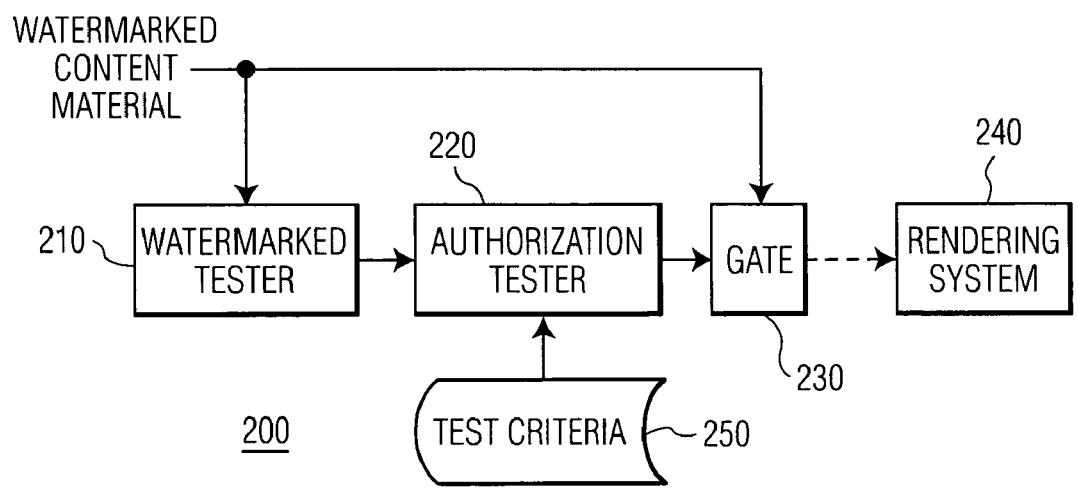
FIG. 2 illustrates an example block diagram of a copy protection system in accordance with this invention.

FIG. 2 illustrates an example block diagram of a security system 200 that is configured to control the rendering of content material, based on the presence or absence of proper watermarks. The security system 200 includes a watermark tester 210 that is configured to detect a watermark and an authorization tester 220 that is configured to control the rendering of the content material, via rendering system 240, based on the output of the watermark tester 210, and based on a set of test criteria 250, via a gate 230. For the purposes of this invention, the term rendering is intended to include any subsequent processing, recording, modification, or translation of the content material.

In accordance with this invention, the authorization tester 220 is configured to determine whether the content material is protected, based on whether any watermark is present in the content material. If the material is determined to be protected, the authorization tester 220 is further configured to determine whether the watermarked content material has been altered, based on a measure of the quality of a detected watermark.

Consider, for example, an illicit attempt to remove a watermark from the watermarked content material that reduces the likelihood of a watermark being detected from a nominal 95% (1−p) to as low as 10% (1−q), and an encoding and detection process that is configured to detect the presence of the watermark at least 99% of the time. Using the equations presented above, in order to assure a 99% detection rate with an increased non-detection rate of q, this equates to:

$$(1-q^n)<=0.01.$$

In this example, with q=0.90, the number of redundant encodings, n, must be at least 42. Thus, the redundancy controller 110 of FIG. 1 would be configured to control the redundant watermark encoder 120 to produce at least 42 redundant encodings of the watermark within the content material, and the authorization tester 220 of FIG. 2 would be configured to determine that the content material is protected if the watermark tester 210 detects at least one of these encodings. Because the watermark is redundantly encoded at least 42 times, at least one of these watermarks is likely to be detected, even if the likelihood of detecting each watermark is reduced to as low as 10%. Thus, the highly redundant encoding of the watermark allows for the detection of the watermark even after a purposeful attempt to substantially reduce the likelihood of the watermark being detected.

Figure 3:
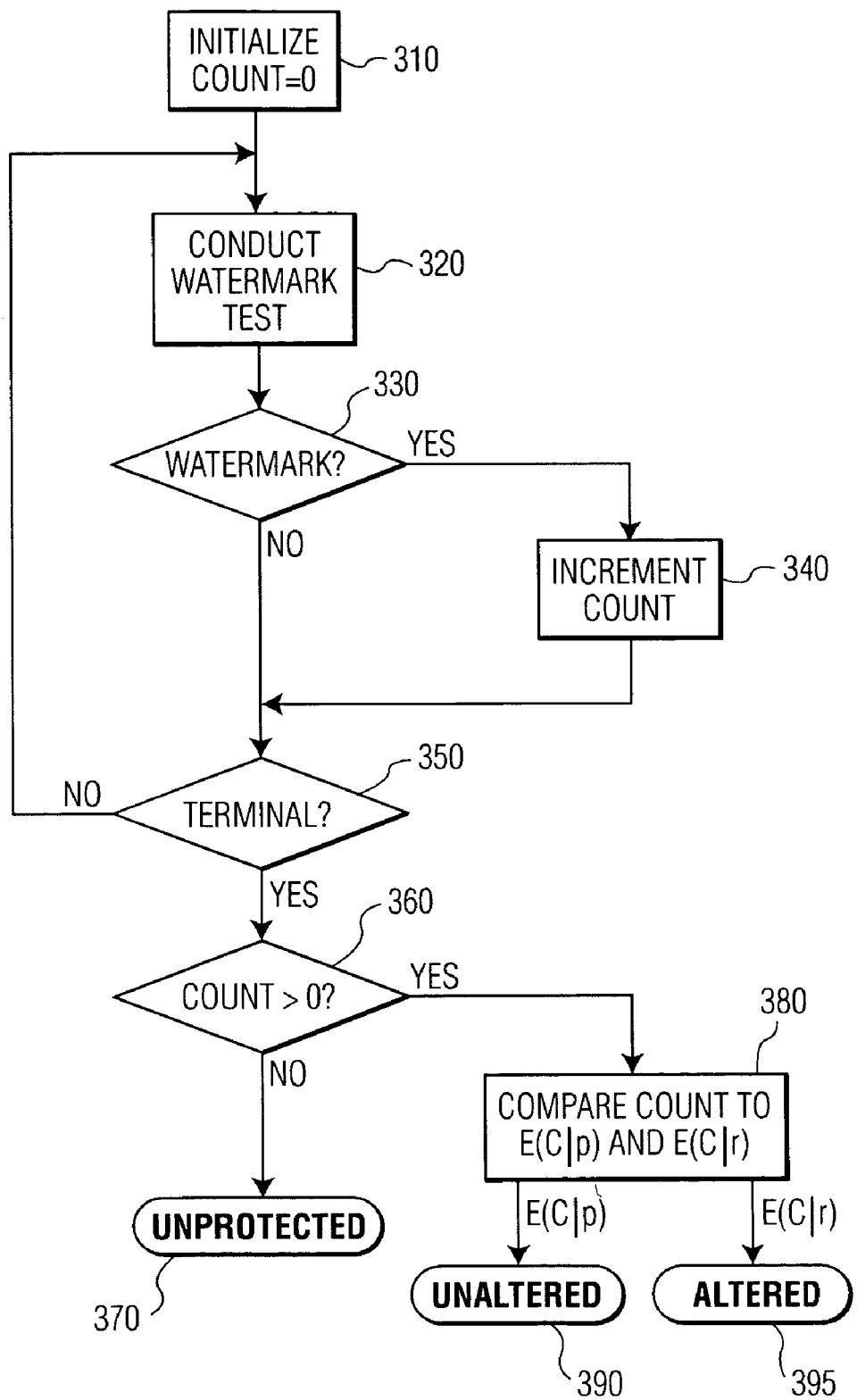
FIG. 3 illustrates an example flow diagram of an authorization test process in accordance with this invention.

FIG. 3 illustrates an example flow diagram of an authorization test process in accordance with this invention. At 310, a count of the number of detected watermarks is initialized to zero. At 320, a watermark tester (210 in FIG. 2) determines whether a watermark is present in the content material. If a watermark is detected, at 330, the count is incremented, at 340. This process continues until terminated, at 350, typically by reaching the end of the content material, or the end of a predetermined segment of the content material that is expected to contain the watermarks. Upon termination, at 360, if no watermarks were detected, the content material is determined to be unprotected, at 370.

In accordance with the second aspect of this invention, the authorization tester 220 is further configured to determine whether the content material has been altered, based upon the number of copies of the watermark that are detected. As noted above, due to limitations of watermark detection processes, the likelihood of a watermark tester 210 failing to recognize a valid watermark is some non-zero percentage, p. As also noted above, a modification of content material has the effect of increasing this failure rate; hereinafter, this increased failure rate is termed "r". Generally, this failure rate is lower than the aforementioned "q" rate that is caused by an intentional attempt to remove the watermark, because it is generally an unintended secondary effect of a transformation of the content material to, for example, a compressed form, such as MP3.

If the content material is altered, the expected failure rate is "r", and the number of properly detected watermarks from altered content material that contains "n" redundant watermarks is $n \cdot (1-r)$.

If the content material is altered, the expected failure rate is "r", and the number of properly detected watermarks from altered content material that contains "n" redundant watermarks is $n*(1-r)$.

In accordance with this second aspect of the invention, the number of properly decoded watermarks is compared to each of these expected values, $n*(1-p)$, $n \cdot (1-r)$, to determine whether or not the content material has been modified, at 380. Depending upon this comparison, a determination is made as to whether the sampled content material corresponds more closely to unaltered material, at 390, or altered material, at 395.

To provide for a reliable determination, the number of redundant copies of the watermark, n, is selected to be large enough to reliably distinguish between these expected values. For example, consider a failure rate, p, of the watermark tester 210 is 0.10 given an unaltered content material, that rises to a rate, r, of 0.20 given an altered content material. If the number of redundant copies, n, is 10, then the expected value of properly decoded watermarks of unaltered content material will be 9, and the number of properly decoded watermarks of altered content material will be 8. Obviously, due to the random factors associated with detecting a watermark, it would be virtually impossible to reliably determine whether an observed number of properly decoded watermarks was from a population whose expected value was 9, compared to a population whose expected value was 8. That is, if in fact, 9 properly decoded watermarks were detected, one of ordinary skill in the art would not be willing to conclude that these watermarks were not from an altered content material whose expected number of properly decoded watermarks is 8. In like manner, detecting only 8 of the 10 watermarks does not automatically lead to a conclusion that the content material has been altered. On the other hand, if the number of redundant copies, n, were 100, leading to expected values of 90 and 80, for unaltered and altered material, respectively, it would be easier to distinguish between the two.

Preferably, conventional statistical techniques, such as the chi-square test, or any of a variety of binomial sampling tests, are used to determine an appropriate number of redundant copies, n, to provide for a reliable distinction between the failure rate caused by the inherent failure rate of the watermark detection process and the increased failure rate of the watermark detection process caused by an alteration of the content material. As in all statistical tests, two parameters, alpha and beta, are used to qualify the reliability of the test. In this application, alpha is the likelihood of erroneously determining that unaltered content material has been altered, and beta is the likelihood of erroneously determining that altered content material has not been altered. Based on the estimated values of p, and r, and the particular test that is to be applied, the value of n can be determined for providing not more than the specified alpha and beta likelihoods of error. Alternatively stated, (1-alpha) and (1-beta) are the likelihoods of not making an erroneous decision, and are commonly termed the "confidence levels" associated with making a decision. In accordance with this invention, the number of redundant copies of the watermark is determined so as to provide a desired level of confidence in distinguishing between altered and unaltered content material.

If the watermark detection process is such that the absence of a proper watermark is detectable, such as a redundant watermarking process that applies a watermark at fixed time intervals, more powerful statistical tests may be employed, such as a runs-test or other sequential test. Of particular note, Wald's Sequential Probability Ratio Test (SPRT) is particularly well suited for rapidly distinguishing between samples drawn from two different populations. As each sample is evaluated, in this case as containing a detected or undetected watermark, the proportion of detected watermarks is compared to a ratio that is based on the expected values of each of the populations. If the proportion of detected watermarks substantially favors one population compared to the other, the test is terminated, and the sample is determined to have been drawn from the substantially favored population. If the proportion of detected watermarks does not substantially favor one population or the other, another sample is drawn, and the test is repeated. As in conventional tests, a total number of possible samples, n, can be determined such that the test is concluded in favor of one or the other populations after the evaluation of all the samples, n, with a given level of confidence in each decision, (1-alpha) and (1-beta). The advantage of the SPRT is that the test may be concluded sooner, with the same level of confidence, with fewer samples being evaluated.

In a preferred embodiment of this invention, the number of redundant watermarks, n1, required for providing a reliable detection of at least one copy of the watermarks in the presence of content material that has been intentional altered to provide a likelihood of detection of (1-q) is determined. And, the number of redundant watermarks, n2, required for reliably distinguishing between unaltered content material having a likelihood of detection of (1-p) and altered content material having a likelihood of detection of (1-r) is determined. The larger of these two numbers, n1 and n2, is used as the number of redundant watermarks that are included in the protected content material so as to provide both a reliable detection of a watermark and also a reliable distinction between altered and unaltered watermarks.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the above examples do not assume that the watermark detector 210 will report the presence of a watermark when a watermark is not present. If such a possibility/probability exists, the aforementioned tests will be adjusted accordingly. In particular, for example, the test at 360 may allow a non-zero count as a threshold for determining whether the content material is truly protected. In like manner, although the above examples assume that each watermark is an identical copy of each other watermark, the watermarks may vary, so as to facilitate, for example, fault isolation or other diagnostic function. These and other system configuration and optimization features will be evident to one of ordinary skill in the art in view of this disclosure, and are included within the spirit and scope of the following claims.

The invention claimed is:

1. A watermarking system comprising:
   a watermark encoder that is configured to encode a watermark upon a segment of protected content material, and
   a redundancy controller, operably coupled to the watermark encoder, that is configured to control the watermark encoder to encode multiple watermarks upon the protected content material, the number of multiple watermarks being determined based on a probability of error or failure rate of the recieving system and a determination of the probability of the recieving system not detaching each of the multiple watermarks, wherein
   the redundancy controller determines a number of the multiple watermarks to encode upon the content material to facilitate detection of at least one of the multiple watermarks at a receiving system to allow that the content material is protected.

2. The watermarking system of claim 1, wherein the redundancy controller further determines the number of the multiple watermarks to facilitate detection of a modification of the protected content material at the receiving system.

3. The watermarking system of claim 1, wherein the number of multiple watermarks, n, satisfies the following equation:

$$(1-q^n) <= k,$$

wherein:
   q corresponds to a probability of not detecting each watermark in the content material, and
   k corresponds to a probability of error in determining that the content material is protected.

4. A security system comprising:
   a watermark tester that is configured to detect a watermark in select content material,
   an authorization tester, operably coupled to the watermark tester, that is configured to control the watermark tester to detect multiple watermarks in the content material, and
   a gate, operably coupled to the authorization tester, that is configured to control a rendering of the content material, based on a detection of one or more of the watermarks in the content material, wherein
   the authorization tester is further configured to maintain a count of the multiple watermarks that are detected by the watermark tester,
   the gate is further configured to control the rendering of the content material based on a comparison of the count of the multiple watermarks with a measure based on a first and second expected values of counts,
   the first expected value corresponding to expected detections from the content material if the content material is unaltered, and
   the second expected value corresponding to expected detections from the content material if the content material is altered.

5. The security system of claim 4, wherein
   the gate is configured to control the rendering based on a result of a statistical test that is applied, based on the count, and
   the statistical test includes at least one of:
      a chi-square test,
      a binomial test, and
      a sequential test.

6. The security system of claim 5, wherein the sequential test includes a sequential probability ratio test.

7. The security system of claim 4, further including:
   a rendering system that is configured to effect the rendering of the content material.

8. A method for determining access rights to content material, comprising:
   detecting one or more watermarks from among a plurality of watermarks that are encoded in the content material,
   maintaining a count of the one or more detected watermarks, and
   providing access to the content material based on the count, wherein
   providing access to the content material includes:
      comparing the count to a measure that is based on a first and second expected values of counts,
         the first expected value corresponding to expected detections from the content material if the content material is unaltered, and
         the second expected value corresponding to expected detections from the content material if the content material is altered.

9. The method of claim 8, wherein
   the measure is based on a statistical test, and
   the statistical test includes at least one of:
      a chi-square test,
      a binomial test, and
      a sequential test.

10. The method of claim 9, wherein
   the sequential test includes a sequential probability ratio test.

11. The method of claim 8, further including:
   rendering the content material.

12. A program stored on a processor readable medium for determining access rights to content material, comprising:
   a program portion configured to detect one or more watermarks from among a plurality of watermarks that are encoded in the content material,
   a program portion configured to maintain a count of the one or more detected watermarks, and
   a program portion configured to provide access to the content material based on the count of the one or more detected watermarks, wherein
   the program portion configured to provide access to the content material includes:
      a program portion configured to compare the count to a measure that is based on a first and second expected values of counts,
         the first expected value corresponding to expected detections from the content material if the content material is unaltered, and
         the second expected value corresponding to expected detections from the content material if the content material is altered.

13. The program portion of claim 12, wherein
   the program portion configured to provide access to the content is configured to provide access to the content based on a result of a statistical test that is applied, based on the count, and
   the statistical test includes at least one of:
      a chi-square test,
      a binomial test, and
      a sequential test.

14. The program portion of claim 13, wherein
   the statistical test includes a sequential probability ratio test.

* * * * *